United States Patent [19]

Holoubek et al.

[11] Patent Number: 4,898,708
[45] Date of Patent: Feb. 6, 1990

[54] METHOD FOR SHAPING CLOSED BOTTOM OF TUBULAR CONTAINER

[75] Inventors: George H. Holoubek; John J. Rhoades, both of Muscatine, Iowa; George P. Whitaker, Triadelphia, W. Va.

[73] Assignee: Wheeling Stamping Company, Wheeling, W. Va.

[21] Appl. No.: 222,387

[22] Filed: Jul. 21, 1988

Related U.S. Application Data

[63] Continuation of Ser. No. 859,475, May 2, 1986, abandoned.

[51] Int. Cl.⁴ .................. B29C 49/22; B29C 49/04
[52] U.S. Cl. ............................ 264/515; 264/514; 264/526; 264/540; 264/573; 264/DIG. 78; 425/388
[58] Field of Search ............ 264/512, DIG. 78, 521, 264/523, 526, 571–573, 511, 515, 514, 540; 425/387.1, 388

[56] References Cited

U.S. PATENT DOCUMENTS

| | | | |
|---|---|---|---|
| 3,047,910 | 8/1962 | Downs | 264/153 |
| 3,329,996 | 7/1967 | Marcus | 264/526 |
| 3,338,997 | 8/1967 | Tigner | 425/388 |
| 3,661,489 | 5/1972 | Moore | 425/388 |
| 4,035,463 | 7/1977 | Rosenkrant et al. | 264/535 |

FOREIGN PATENT DOCUMENTS

| | | |
|---|---|---|
| 39-8674 | 5/1964 | Japan ................................ 264/526 |
| 115224 | 7/1984 | Japan ................................ 264/512 |
| 603502 | 6/1948 | United Kingdom . |
| 1003019 | 9/1965 | United Kingdom . |
| 1378319 | 12/1974 | United Kingdom . |
| 1469756 | 6/1977 | United Kingdom . |
| 2107636 | 5/1983 | United Kingdom . |

Primary Examiner—Jan H. Silbaugh
Assistant Examiner—Neil M. McCarthy
Attorney, Agent, or Firm—Parmelee, Miller, Welsh & Kratz

[57] ABSTRACT

A method for producing thermoplastic tubular containers having a tubular wall section, open neck, and integral sealed bottom where a thermoplastic disc, is sealed to the inner wall of the tubular wall section, and the disc, while in a moldable state, is formed into a bottom wall by application of either a vacuum to the exterior surface of the disc or a fluid pressure to the interior of the tubular wall section, or both, to mold the disc in a mold cavity to a desired shape. A supporting sleeve surrounds the tubular wall section during application of the fluid pressure. Thermoplastic containers can be formed from a single thermoplastic material or from laminates, such as a laminate material containing an oxygen impermeable layer.

23 Claims, 3 Drawing Sheets

METHOD FOR SHAPING CLOSED BOTTOM OF TUBULAR CONTAINER

This is a continuation of co-pending application Ser. No. 859,475, filed on May 2, 1986, now abandoned.

BACKGROUND OF THE INVENTION

The present invention relates to a method for producing tubular plastic containers and, more specifically, to producing tubular plastic containers from a tubular sleeve, having an open neck at one end and an open end at the other end, by closing the open end thereof with an integral sealed bottom wall.

Thermoplastic tubular containers, especially collapsible or squeezable containers, have continued to take over an increasing share of the container market from metallic tubes. Such thermoplastic tubular containers are extensively used in packaging of cosmetics, medicinal preparations, shampoos and other products. With the increased development of multilayer or laminated tubes having oxygen barrier properties, that resist oxygen, or other gas permeation, further increases in packaging of pharmaceutical products and of foodstuffs in thermoplastic tubes are occurring. In addition to the packaging of products for use by consumers in a collapsible tube form, the use of collapsible thermoplastic containers or bag-like receptacles are also used in aerosol can applications where the product to be sprayed from the aerosol can is protected in a thermoplastic container separate from a pressurized fluid which is, in turn, contained within an outer shell, such as a metallic pressure resistant can.

One process for the formation of thermoplastic tubular containers is described in Myron H. Downs, U.S. Pat. No. 3,047,910 the contents of said patent incorporated by reference herein. As described therein, thermoplastic tubular containers are fabricated by placing a thermoplastic tubular member, or hollow tube, into a forming collar and forcing a cut, molten disc into an open end of the tubular member. The latent heat of the molten disc is sufficient to weld the peripheral edge of the disc to the inner wall of the tubular member and thus, form an end closure or head for the tubular container. As described, pressure is exerted through the interior of the tubular container to the sealed end closure to shape the latter to a desired contour The preferred means for applying pressure to the sealed end closure is through the use of a mandrel that is inserted through the open end of the tubular member. Air pressure or vacuum are not suggested for forming the contour of the sealed end closure, although it is suggested that air under suitable pressure or a reciprocable flat end mandrel may be admitted interiorly of the tubing to assure that a flat end-closure is not distorted upon cooling and remains desirably flat.

A further process for forming collapsible thermoplastic tubular containers is described in U.S. Pat. No. 3,962,006. In that process, a laminated film is used to form a thermoplastic sleeve having an impermeable layer, and a molten disc also having an impermeable layer is welded to the interior wall of the laminated thermoplastic sleeve. A pressing operation is used to form a head member on the tube, the pressing operation using a female mold and a core which interiorly supports the laminated thermoplastic sleeve.

These processes relate to the formation of headed sections on tubular sleeves and are usable only when a fully open end of the container is provided opposite the headed section to be formed, for insertion of a headed core or internal mandrel into the interior of the tubular sleeve to press the headed section into conformity with a female mold. When the other end wall or bottom of the tubular container is formed, such is normally formed merely by heat sealing transversely across the bottom to close the same. In the formation of such a transverse heat sealed bottom, however, flared or webbed portions result at the opposite ends of the transverse seal which can be detrimental in certain applications, and also results in a container that cannot be supported freely by the bottom wall on a flat surface.

In formation of collapsible thermoplastic tubes in the nature of a bottle or bag for use in aerosol containers, the flared portion on the transversely sealed bottom wall is not desirable due to the space limits of the aerosol can in which the tube is to be used.

It is an object of the present invention to provide a process for sealing integrally a bottom wall to a thermoplastic tubular container having an open neck at the top end thereof.

SUMMARY OF THE INVENTION

A thermoplastic container having a tubular wall section, open-neck top, and an integral, sealed bottom wall is formed by providing an open-neck top section on a tubular wall section and sealing the bottom by insertion therein of a molten thermoplastic disc such that the latent heat of the disc seals the disc to the inner circumferential wall of the tubular wall section, and; while the disc is still in a moldable state, forming the disc to the shape of a closed bottom mold cavity by applying a vacuum to the exterior surface of the disc or applying a fluid pressure to the interior of the tubular wall section through the open neck, while blocking the open-neck region, or applying both said vacuum and said fluid pressure, to mold the disc to a desired shape in a mold cavity. The tubular wall section is maintained in a supporting sleeve which mates with the closed bottom mold. Fluid pressure is applied to the interior of the tubular member against the bottom wall by means of a conduit, or other means, through the open neck thereof, while the closed bottom mold has means therein for applying a vacuum to the exterior surface of the disc.

The integral, sealed bottom wall may be formed as a flat wall, or concave shape, or is a convex or dome-shaped wall extending towards the interior of the finished container. The container, including the integral, sealed bottom wall, may be of a single thermoplastic material or formed from a laminated or layered material which includes a gas impermeable layer or barrier The tubular wall section may be cylindrical in shape or have longitudinal ribs extending therealong, or be of another profile.

DETAILED DESCRIPTION

The present method provides a means for forming thermoplastic containers having an open neck and a tubular wall section and an integral sealed bottom wall of a desired configuration. The method is applicable to thermoplastic containers of a single thermoplastic resin or to thermoplastic containers formed from laminated plastic materials containing a barrier layer, such as an oxygen impermeable layer. A specific application of the present method is the formation of an integral, sealed bottom wall on a tubular member having an open neck at one end and an open end at the other end thereof on a tubular wall section formed by extruding a cylindrical wall section followed by formation of the open neck thereon.

Figure 1:
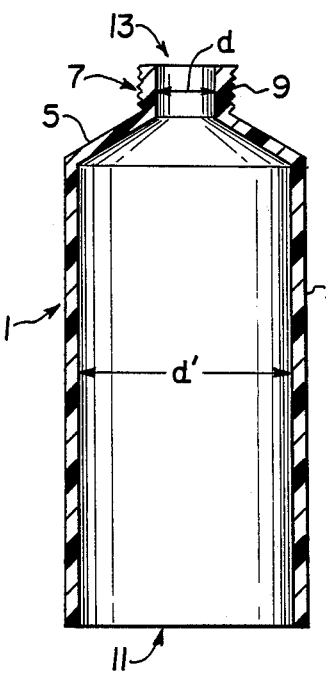
FIG. 1 is a cross-sectional view of a thermoplastic tubular wall section having an open neck and open bottom for use in forming thermoplastic containers according to the present method.

Referring now to FIGS. 1 through 5, the formation of a tubular thermoplastic container or bottle from a thermoplastic resin is illustrated, the tubular thermoplastic container having a slightly concave bottom wall. As illustrated in FIG. 1, a tubular member 1, has a tubular wall section 3, with an inwardly directed upper wall portion 5 which terminates as an open neck section 7, the open neck section 7 preferably having threads 9 on the outer surface thereof for use in applying a threaded cap (not shown) for subsequent sealing of the container after a desired product has been placed therein. The tubular wall section 3 is open at its bottom 11, while the open-neck portion 7 has an inner diameter d less than the inner diameter d' of the tubular wall section 3. The tubular wall section 3, with its open-neck 7 and open bottom 11 may be formed by any known process, and may be of any desired shape, but is preferably formed by extruding a hollow cylinder of thermoplastic material and then forming the open neck section by a process similar to that described in U.S. Pat. No. 3,047,910, wherein a neck portion is sealed and pressed into shape using a molten disc of thermoplastic material which welds with the hollow cylinder. An opening is then punched through the pressed form, to provide an orifice, such as 13, for later dispersing of product from the tubular container.

Figure 2:
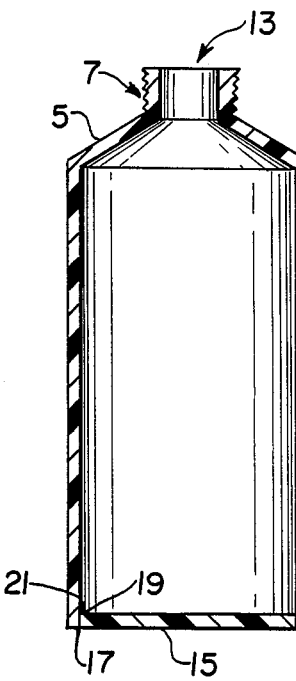
FIG. 2 is a cross-sectional view of the thermoplastic tubular wall section of FIG. 1 upon closing of the bottom with a molten disc of thermoplastic material welded to the inner periphery thereof.

A molten thermoplastic disc 15 is then applied within the confines of the open end 11 of the tubular wall section and sealed to the inner circumferential wall thereof, as illustrated in FIG. 2. The thermoplastic disc is sealed to the inner circumferential wall of the tubular wall section as at 17, preferably by forcing the cut, molten disc into the open end 11 of the tubular wall section 3 and using latent heat of the molten plastic disc 15 to weld the peripheral edge 19 of the disc to the inner circumferential wall 21 of the tubular wall section.

Figure 3:
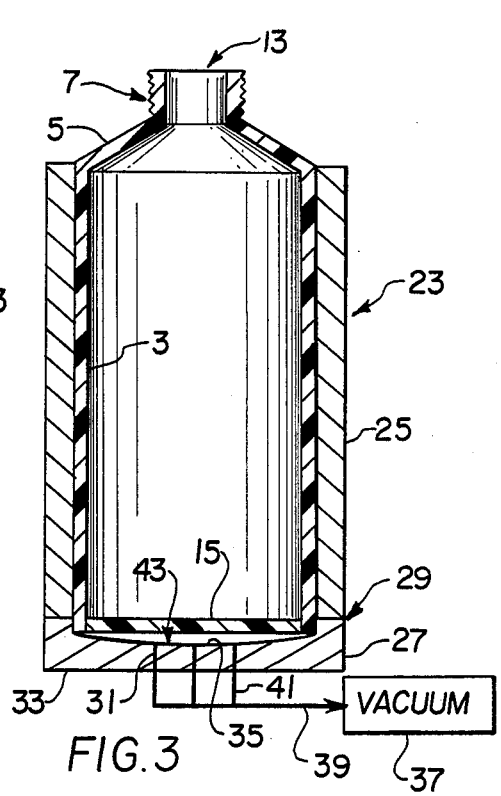
FIG. 3 is a cross-sectional view of the closed bottom wall and thermoplastic wall section of FIG. 2 upon insertion into a mold sleeve for forming of the closed bottom wall thereof.

While the plastic disc 15 is still in a moldable state, but after formation of the seal 17, the tubular wall section 3 having the open neck section 7 at one end thereof, and the plastic disc 15 at the other end thereof, is placed into a mold sleeve as illustrated in FIG. 3. The mold sleeve 23, as illustrated has a sleeve portion 25 and a closed bottom mold cavity 27, the sleeve portion and bottom cavity mating together, as at mating line 29. The closed bottom cavity 27 may have a plurality of small diameter apertures 31 therethrough from the outer surface 33 to the inner surface 35 thereof for use in applying a vacuum therethrough. The number and diameter of the apertures should be sufficient to exhaust air trapped between the disc and the inner surface 35 of the bottom mold cavity but insufficient to cause formation of objectionable bosses on the finished tube bottom. A source of vacuum 37, such as a vacuum pump, communicates with the apertures 31 by means of line 39 and branch lines 41. The tubular wall section 3 is inserted within the mold sleeve 23 with the tubular wall section 3 in close proximity to the surrounding mold sleeve portion 25 and the plastic disc, in a moldable state, adjacent the closed bottom cavity 27. In FIG. 3, the closed bottom cavity has a slight concave inner surface 43 so as to form a slightly convex bottom wall on the tube.

Figure 4:
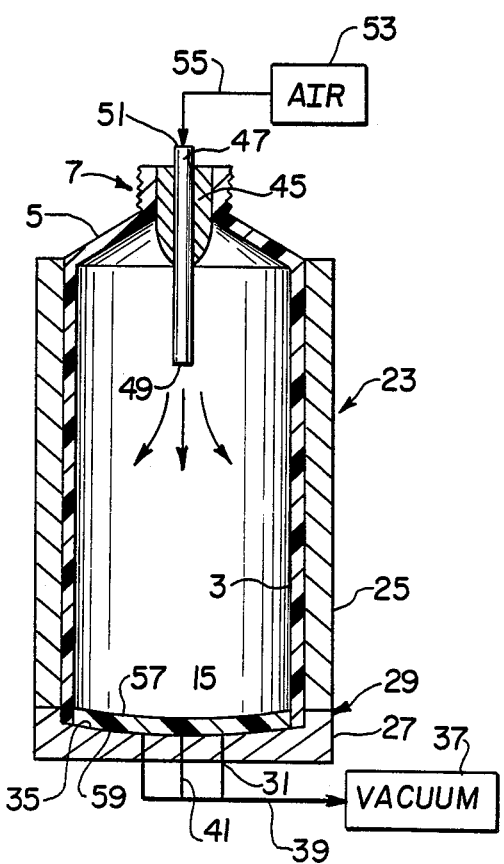
FIG. 4 is a cross-sectional view similar to FIG. 3 illustrating the application of vacuum to the exterior surface of the bottom wall disc and application of a fluid pressure to the inner confines of the tubular wall section and closed end to form the bottom wall to a desired shape.

After placement of the tubular wall section 3 into the mold sleeve 23, with the closed bottom containing the disc 15, and at least a major portion and preferably all of the tubular wall section 3 between the bottom wall and the inwardly directed upper wall portion 5 contained within the mold sleeve, a fluid pressure is applied to the interior confines of the tubular wall section and closed other end, through the open neck section 7, as illustrated in FIG. 4. The fluid pressure is applied through the open neck 7 such as by inserting a plug 45 into the open neck, the plug having a fluid conduit 47 therethrough, with one end 49 of the conduit 47 terminating within the confines of the tubular wall section 3 and disc of the closed bottom 15, while the other end 51 thereof is connected to a source of fluid pressure 53, such as a pressurized air source, through line 55.

Figure 5:
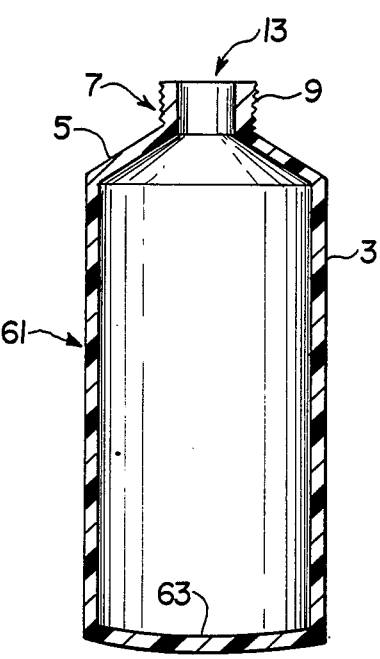
FIG. 5 is a cross-sectional view of a thermoplastic tubular container formed according to one embodiment of the present method.

The disc, while in a moldable state, may be shaped to the confines of the closed bottom mold by the use of the fluid pressure, by the use of the vacuum, or by the use of both. As illustrated in FIG. 4, both fluid pressure and vacuum are used. While a vacuum is applied to the exterior surface 59 of the plastic disc by means of vacuum source 37, lines 39 and 41 and apertures 31, the pressurized air is applied to the inner confines of the tubular wall section 3 and bottom wall 15, as indicated by the arrows in FIG. 4, against the interior surface 57 plastic disc. The plastic disc, being in its moldable state, will be molded to the shape of the inner surface 35 of the bottom mold cavity 27. After formation of the closed bottom, the bottle or tube is removed from the sleeve mold 23. FIG. 5 illustrates the resultant formed tubular container 61. The closed bottom 63 formed will normally be of a thicker cross-section than the tubular wall section 3 and provides strength and stability for the tubular container.

The application of vacuum to the exterior surface of the plastic disc or the application of fluid pressure to the interior confines of the tubular wall section and closed bottom, or both, are effected while the thermoplastic of the disc is in a moldable state. The thermoplastic of the disc is no longer in a purely molten state or above its melting point after the latent heat thereof has welded the disc to the tubular wall, but must still be above the glass transition temperature of the thermoplastic so that the same is soft and flexible and moldable to the desired shape.

Figure 6:
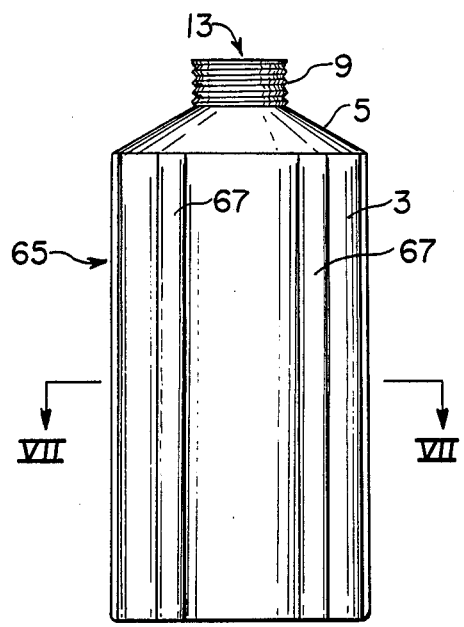
FIG. 6 is a perspective view of another embodiment of a thermoplastic tubular container produced according to the present method.
Figure 7:
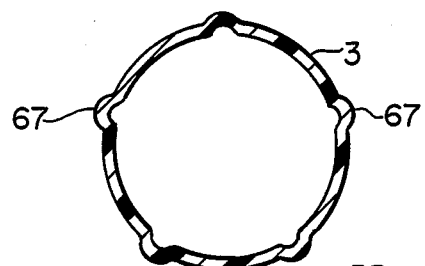
FIG. 7 is a cross-sectional view taken along lines VII—VII of FIG. 6.

As illustrated in FIGS. 6 and 7, a collapsible thermoplastic container 65 may be prepared according to the present process wherein the tubular wall section 3 has a plurality of longitudinal grooves or channels 67 spaced about the circumference of the tubular wall section, by using a tubular wall section having such grooves therein.

Figure 8:
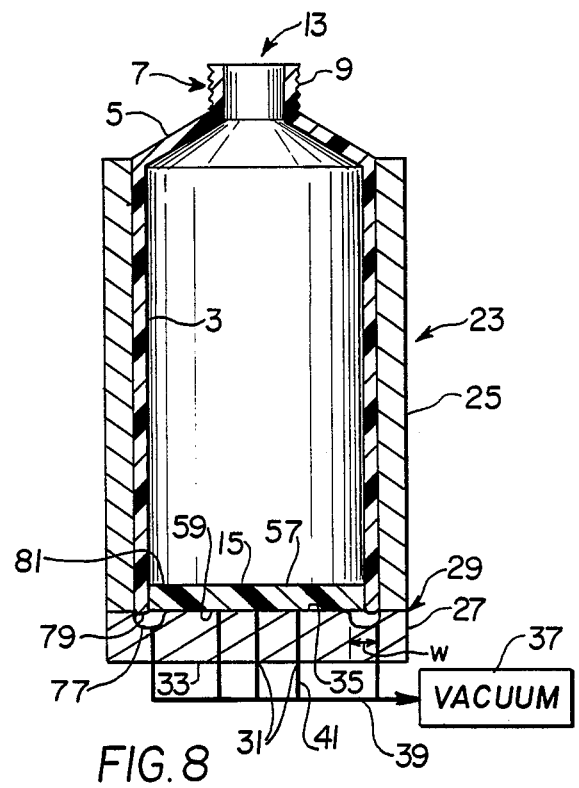
FIG. 8 is a cross sectional view of another embodiment of the present invention illustrating a closed bottom wall and thermoplastic wall section upon insertion into a mold sleeve for forming of a closed bottom wall having a peripheral support rim thereabout.
Figure 9:
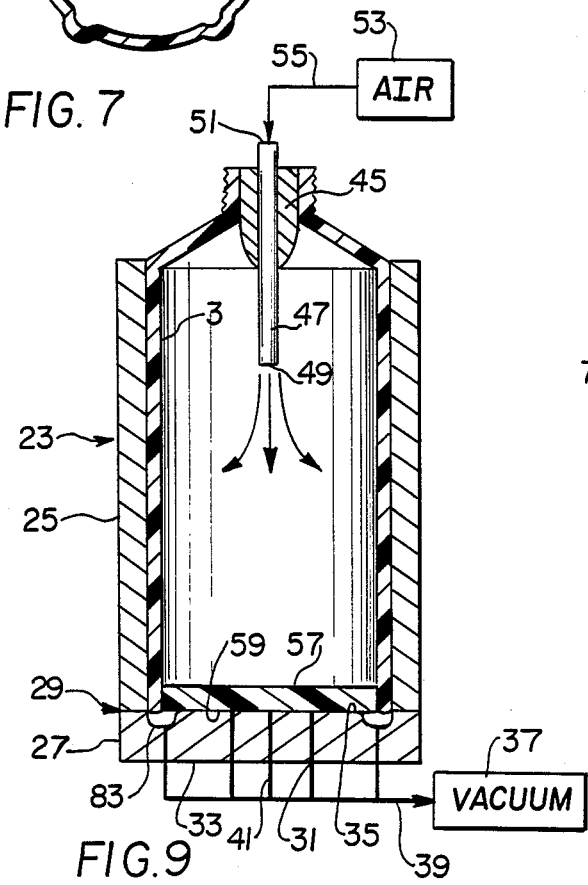
FIG. 9 is a cross-sectional view similar to FIG. 8 illustrating the application of vacuum to the exterior surface of the bottom wall disc and application of a fluid pressure to the inner confines of the tubular wall section and closed end to form the bottom wall with a peripheral support rim.
Figure 10:
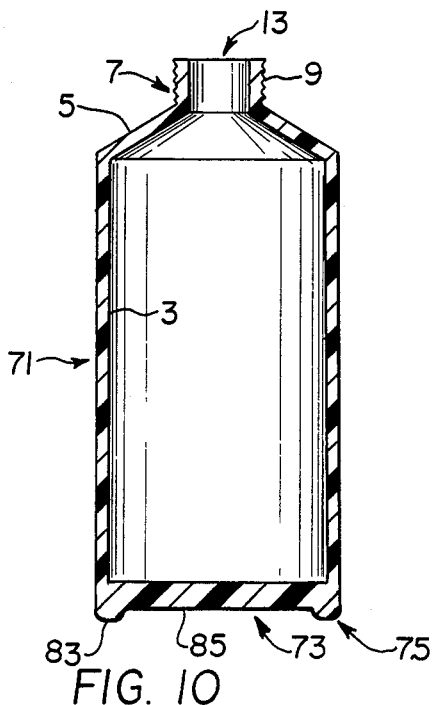
FIG. 10 is a cross-sectional view of a thermoplastic tubular container formed according to another embodiment of the present method.

A preferred form of thermoplastic container 71 that can be produced according to the present process is illustrated in FIGS. 8 through 10 wherein the bottom wall 73 is concave in shape with a thickened wall portion 75 about the periphery thereof. Referring now to FIG. 8, tubular wall section 3, with inwardly directed upper wall portion 5, threaded open neck 7, having threads 9 and orifice 13, with a moldable disc 15 in the bottom, is inserted into a mold sleeve 23. The mold sleeve 23 comprises a sleeve portion 25 and closed bottom cavity 27, as in the illustration of FIG. 3, with parting line 29. The vacuum source 37 is provided in conjunction with lines 39 and 41 and apertures 31, apertures 31 extending from exterior mold surface 33 to interior mold surface 35. In this embodiment, however, a circular groove 77 is provided in the interior surface 35, about the periphery of the inner surface, at the location of the seam between tubular wall section 3 and bottom wall 15. The groove is of a width w sufficient to accept the bottom wall 79 of the tubular wall section 3 as well as a peripheral portion 81 of the disc 15. Upon application of a vacuum to the outer surface 59 of the disc, which is in a moldable state, and to the bottom wall 79 of the tubular wall section 3, the bottom wall is drawn towards the groove, as is the peripheral portion 81 of the disc 15. Also, with application of a fluid pressure to the confines of the tubular wall section 3 and closed bottom, against the inner surface 57 of the disc, when fluid pressure is applied, a composite peripheral wall section or rim 83 (FIG. 9) is formed as a thickened, downwardly extending, support rim, about the periphery of the bottom wall, and a recessed or concave tube bottom 85 results, which rim provides a strong support for the tubular container when placed on a flat surface.

Figure 11:
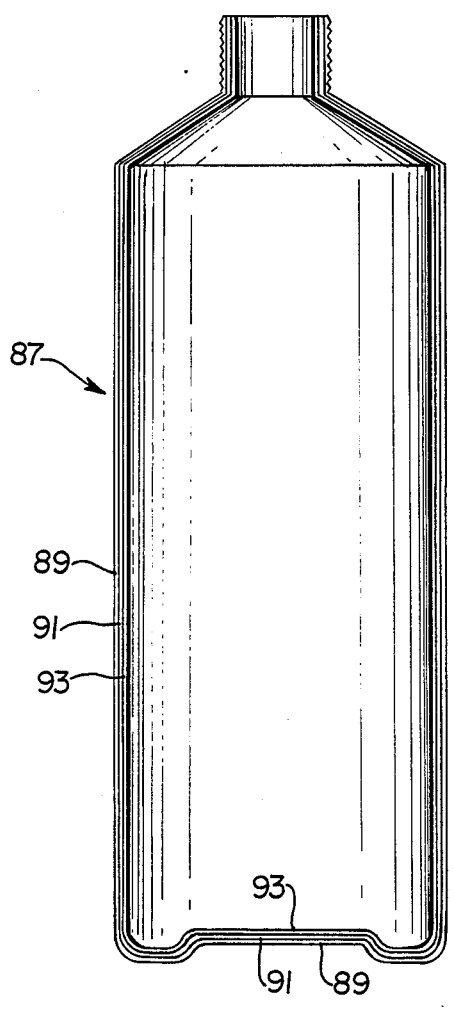
FIG. 11 is a cross sectional view of a laminated structure thermoplastic tubular container produced according to the present invention comprising a three layer laminated structure.
Figure 12:
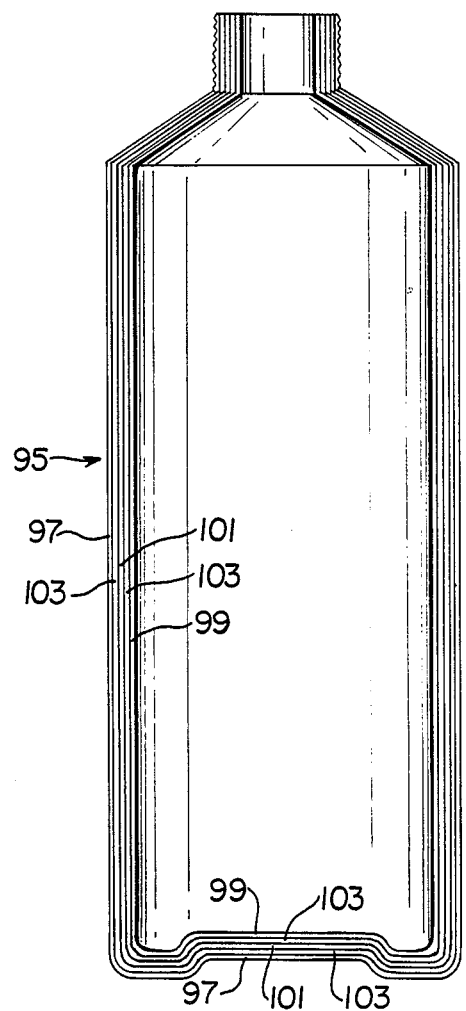
FIG. 12 is a cross-sectional view of a laminated structure thermoplastic tubular container produced according to the present invention comprising a five layer laminated structure.

The present process is also applicable to formation of tubular thermoplastic containers of laminated or layered thermoplastic materials, as illustrated in FIGS. 11 and 12. Such laminates comprise layers of a thermoplastic material and a barrier layer such as aluminum foil, or the like, or layers of variant plastic materials which may be co-extruded in layers to form a multi-layer thermoplastic material. In formation of such tubular thermoplastic containers, the tubular wall section and plastic disc are formed from laminated plastic material and then sealed together and molded as would be a thermoplastic tubular container of a single thermoplastic material. The container 87 illustrated in FIG. 11 is formed from a three layer tubular wall section and a three layer molten disc. Such a three layer composite would comprise an outer layer 89, intermediate layer 91 and inner layer 93, where the inner and outer layers are formed of a thermoplastic material different than the intermediate layer. For example, the outer layer 89 and inner layer 93 could be polyethylene, or other thermoplastic, while the intermediate layer 91 is an oxygen impermeable layer, which may be a polyamide such as nylon, or ethylene polyvinyl alcohol, a polyvinylidene chloride, or the like. FIG. 12 illustrates a container 95 having a similar laminated structure wherein a five layer composite comprises an outer layer 97, inner layer 99, intermediate impermeable layer 101, and two layers of an adhesive 103, one of the layers of adhesive 103 situated between the intermediate layer 101 and each of the outer layer 97 and the inner layer 99. Such a five layered construction can, for example, comprise a thermoplastic such as polyethylene, polypropylene, a polyester such as polyethylene terephthalate, or the like, as the outer layer 97 and the inner layer 99, an intermediate layer 101 of an oxygen impermeable material such as nylon, ethylene polyvinyl alcohol, polyvinylidene chloride, or the like, and adhesive layers 103 to bond the intermediate layer to each of the inner and outer layers.

The present invention is thus adaptable to the formation of thermoplastic tubular containers with an open neck portion, tubular wall section and closed bottom of a variety of thermoplastic materials, or laminated material. Such thermoplastic tubular containers, formed according to the present process will have a tubular wall section of between about 0.010 to 0.040 inch in thickness, and a bottom wall of between about 0.010 to 0.080 inch in thickness. Pressure applied will range between about 5 to 140 pounds per square inch gauge, while vacuum applied will range between about 10-30 inches. Polyethylene tubular containers have been formed having a tubular wall section of between about 0.016 to 0.020 inch in thickness having a bottom wall of about 0.040 to 0.060 inch thickness, using a fluid pressure applied of less than about 20 pounds per square inch gauge, and a vacuum applied of about 15 to 20 inches. Since the tubular wall section may be an extruded tubular section, the wall thickness is very uniform and variations in wall thickness are within a value of about ±10 percent of the thickness of the tubular wall.

The present invention provides a method for the formation of a bottom wall, on a tubular preform having an open neck, of various shapes and thicknesses. The use of an extruded tubular wall section enables formation of tubular containers having very uniform wall section thickness, ±10 percent of the wall thickness. The bottom wall may be the same thickness or may be a thickness of two to three times the thickness of the container wall but readily formed into a desirable shape or contour.

What is claimed is:

1. A method for producing a tubular thermoplastic container having an open neck at one end and a sealed bottom wall at the other end comprising:

forming an extruded tubular wall section of a substantially uniform wall thickness;

forming a narrow open neck section at one end thereof;

applying a thermoplastic disc at the other end thereof, said thermoplastic disc welded at its peripheral edge to the circumferential wall at said other end of the tubular wall section to close said other end, with said thermoplastic disc being in a moldable state; then, placing said closed end, and at least a major portion of the tubular wall section, into a mold sleeve having a closed bottom cavity with said at least major portion of said tubular wall section in close proximity to said mold sleeve and said disc adjacent said closed bottom cavity; and forming said thermoplastic disc, while the same is still in a moldable state, to cause the disc to conform in shape to said closed bottom cavity to form said sealed bottom wall, while maintaining said substantially uniform wall thickness and said extruded shape of said tubular wall portion in close proximity to said mold sleeve, said forming of said thermoplastic disc occurring by application of vacuum to the exterior surface of said disc, or by application of fluid pressure to the interior confines of the tubular wall section and closed bottom, or by a combination of both exterior vacuum and internal fluid pressure has been inserted after "sleeve".

2. The method as defined in claim 1 wherein said forming is effected by applying a vacuum to the exterior surface of said thermoplastic disc.

3. The method as defined in claim 2 wherein, while applying said vacuum, forming is also effected by applying a fluid pressure, through said open neck into the confines of said tubular wall section and closed other end.

4. The method as defined in claim 3 wherein said fluid pressure is provided by injecting pressurized air into said confines.

5. The method as defined in claim 1 wherein said forming is effected by applying a fluid pressure, through said open neck into the confines of said tubular wall section and closed other end.

6. The method as defined in claim 5 wherein said fluid pressure is provided by injecting pressurized air into said confines.

7. The method as defined in claim 1 wherein the closed bottom cavity of said mold sleeve is concave in shape and a bottom wall is formed on said container having a convex shape.

8. The method as defined in claim 7 wherein said tubular wall section has a plurality of longitudinal grooves spaced about the circumference thereof.

9. The method as defined in claim 1 wherein said closed bottom cavity of said mold sleeve has a circular groove about the periphery of the inner surface thereof, and wherein the bottom end of said tubular wall section and the peripheral edge of said disc are situated adjacently above said groove, whereby a bottom wall is formed on said container having a thickened, downwardly extending, support rim thereabout.

10. The method as defined in claim 1 wherein said tubular wall section comprises a laminate of a plurality of layers of material and said thermoplastic disc also comprises a laminate of a plurality of layers of material.

11. The method as defined in claim 10 wherein at least one of said layers is a barrier layer.

12. The method as defined in claim 9 wherein said barrier layer is comprised of an oxygen impermeable material.

13. A method for producing a tubular thermoplastic container having an open neck at one end and a sealed bottom wall at the other end, wherein an extruded tubular wall section, having a substantially uniform wall thickness, is formed having both ends open, and a narrow open neck section is then formed at one open end thereof, and the sealed bottom wall is then formed at the other open end thereof, comprising:

applying a molten thermoplastic disc within the confines of said other open end, and allowing the latent heat of the molten disc to weld the peripheral edge of the disc to the inner circumferential wall of said tubular wall section, to seal the same to the walls of the tubular wall section and close said other end with said thermoplastic disc being in a moldable state; then, placing said closed other end, and at least a major portion of the tubular wall section, into a mold sleeve having a closed bottom cavity with at least a major portion of the tubular wall section in close proximity to the mold sleeve and the disc adjacent the closed bottom cavity; and forming said thermoplastic disc, while the same is still in a moldable state, to cause the disc to conform in shape to said closed bottom cavity to form said sealed bottom wall, while maintaining said substantially uniform wall thickness and said extruded shape of the tubular wall portion in close proximity to said mold sleeve, said forming of said thermoplastic disc occurring by application of vacuum to the exterior surface of said disc, or by application of fluid pressure to the interior confines of the tubular wall section and closed bottom, or by a combination of both exterior vacuum and internal fluid pressure has been inserted after "sleeve".

14. The method as defined in claim 13 wherein said forming is effected by applying a vacuum to the exterior surface of said thermoplastic disc.

15. The method as defined in claim 14 wherein, while applying said vacuum, forming is also effected by applying a fluid pressure, through said open neck into the confines of said tubular wall section and closed other end.

16. The method as defined in claim 13 wherein said forming is effected by applying a fluid pressure, through said open neck into the confines of said tubular wall section and closed other end.

17. The method as defined in claim 13 wherein said closed bottom cavity of said mold sleeve has a circular groove about the periphery of the inner surface thereof, and wherein the bottom end of said tubular wall section and the peripheral edge of said disc are situated adjacently above said groove, whereby a flat bottom wall is formed on said container having a thickened, downwardly extending, support rim thereabout.

18. The method as defined in claim 13 wherein said tubular wall section comprises a laminate of a plurality of layers of material and said thermoplastic disc also comprises a laminate of a plurality of layers of material.

19. The method as defined in claim 18 wherein at least one of said layers is comprised of an oxygen impermeable material.

20. A method for producing a tubular thermoplastic container having an open neck at one end and a sealed bottom wall at the other end comprising:
   forming an extruded tubular wall section of a substantially uniform wall thickness;
   forming a narrow open neck section at one end thereof;
   applying a thermoplastic disc at the other end thereof, said thermoplastic disc welded at its peripheral edge to the inner circumferential wall at said other end of the tubular wall section to close said other end, with said thermoplastic disc being in a moldable state; then,
   placing said closed end, and at least a major portion of the tubular wall section, into a mold sleeve having a closed bottom cavity with at least a major portion of the tubular wall section in close proximity to the mold sleeve and the disc adjacent the closed bottom cavity;
   applying a vacuum to the exterior surface of said thermoplastic disc, while the same is still in a moldable state; and
   applying a fluid pressure, through said open neck into the interior confines of said tubular wall section and closed other end, while applying said vacuum, whereby said thermoplastic disc is molded within said closed bottom cavity to form said sealed bottom wall, while maintaining said substantially uniform wall thickness and said extruded shape of said tubular wall portion in close proximity to said mold sleeve.

21. The method as defined in claim 20 wherein said closed bottom cavity of said mold sleeve has a circular groove about the periphery of the inner surface thereof, and wherein the bottom end of said tubular wall section and the peripheral edge of said disc are situated adjacently above said groove, whereby a flat bottom wall is formed on said container having a thickened, downwardly extending, support rim thereabout.

22. The method as defined in claim 20 wherein said tubular wall section comprises a laminate of a plurality of layers of material and said thermoplastic disc also comprises a laminate of a plurality of layers of material.

23. The method as defined in claim 22 wherein at least one of said layers is comprised of an oxygen impermeable material.

* * * * *

UNITED STATES PATENT OFFICE
CERTIFICATE OF CORRECTION

PATENT NO. : 4,898,708
DATED : February 6, 1990
INVENTOR(S) : George H. Holoubek, et al.

It is certified that error appears in the above-identified patent and that said Letters Patent is hereby corrected as shown below:

Claim 1, last line: delete ---has been inserted after "sleeve"---.

Claim 13, last line: delete ---has been inserted after "sleeve"---.

Signed and Sealed this

Fifth Day of February, 1991

*Attest:*

HARRY F. MANBECK, JR.

*Attesting Officer*      *Commissioner of Patents and Trademarks*